3,359,162
DI-ARGININE-GLUCOSE-1-PHOSPHATE AND
METHOD OF USING SAME
Giuseppe Ghielmetti, Piazza Caneva 5, Milan, Italy
No Drawing. Filed Mar. 4, 1964, Ser. No. 349,474
3 Claims. (Cl. 167—65)

This invention relates to a new therapeutic product having an antitoxic action, as well as to a method for making said compound.

As well known, neurologic syndromes, which accompany some hepatic disfunctions—such as cirrhosis and heavy hepatic insufficiencies—can be traced back to the presence of high amounts of ammonia in the system.

One purpose of this invention is the provision of a drug suitable to act as a remedy against such neurotoxic manifestations derived from hepatic insufficiencies or from hepatitis with consequent hyperammoniaemiae, said drug relieving pain and removing excessive amounts of ammonia that are in the system.

Moreover, it has been surprisingly ascertained that the action of the drug according to this invention is not restricted to the liver, but covers also the hyperazotemiae on condition that the nephron is not irreversibly injured.

More precisely, the compound according to the invention is capable of exerting a double hepato-renal action of great significance for the metabolism of urea. In other words, the drug according to the invention exerts not only a catalysing action on the ureogenesis of the liver, but also an action resulting in a reduction of the azotemic blood content.

The above results are obtained by the use of the drug according to the invention, and which is characterized in that it consists of di-arginine-glucose-phosphate obtained by reacting 1 mole of glucose-1-phosphoric acid with 2 mols of arginine.

The above-specified drug is obtained by causing 1 mole of glucose-1-phosphoric acid to react with two moles of arginine.

Glucose-1-phosphoric acid is an already known compound (see F. Cori; J. Biol. Chem., 121, 465, 1937, and Biochem. Prepar., 1.33, (1939); it is a rather strong acid so that it can be titrated with caustic soda in aqueous solution using phenophthalein as indicator. The aqueous solution of said acid can be obtained from aqueous solutions of its alkaline salts (readily crystallizable substances) by treatment with cation exchange resins.

Arginine is a well known amino acid which has been investigated by many authors (Krebs, Henseleit, du Ruisseau, Colalongo & Inesi, Della Pietra & Rogliani, Fahey and others).

By slowly adding an aqueous solution of arginine to an aqueous solution of glucose-1-phosphoric acid, the resulting potentiometric curve will show two sharp deflections, that correspond to two salifications, one at a pH value of 4.5, and the other at a pH value of 7.8.

Thus, the compound according to the invention is obtained at a pH value of about 7.8. Such compound is the reaction product of one mole of glucose-1-phosphoric acid and two moles of arginine. Said new salt is obtained in the form of a slightly hygroscopic, crystalline white powder, readily soluble in water and insoluble in ethyl alcohol and acetone.

The compound according to the invention can be crystallized with 4 moles of water from its concentrated aqueous solutions. The product shows a specific rotary power $[\alpha]20_D = 47°$ (C.=2; $H_2O$). The anhydrous product shows a content of 42.74% of glucose-1-phosphoric acid, and of 57.25% of arginine base.

Practically complete stability is shown by the aqueous solutions of arginine glucose-1-phosphate at room temperature, and at physiological pH-values.

In fact, in a 20% solution kept in a boiling water bath for 30 minutes the percentage of phosphorus hydrolised at pH-values of 6.7 and 8 are 1.6–1.0–0.7%, respectively.

*Example of preparation*

300 g. of a disodium glucose-1-phosphate tetrahydrate are dissolved in 2,000 cc. of distilled $H_2O$.

The solution is conducted through a strong cation exchange resin bed and the acid effluent is titrated with sodium hydroxide, using phenolphthalein as indicator.

Then, the theoretical amount of arginine base (2 moles per mole of disodium glucose-1-phosphate tetrahydrate) is added while stirring.

The final pH value is approximately 7.3.

The solution is vacuum-concentrated, down to 950–1000 cm.$^3$ by heating in a water bath at 40°–50° C., whereafter such concentrated solution is slowly added while vigorously stirring to 5.5 volumes of methyl alcohol. A white crystalline precipitate forms immediately. The precipitate is separated by filtering under vacuum or centrifuged in a perforated basket, and then washed twice with a total amount of 500 cc. cm.$^3$ of methyl alcohol.

The resulting product which is a white crystalline powder, is vacuum dried. Yield: 500–550 g.

*Analysis.*—for $C_{18}H_{41}O_{13}N_8P \cdot 4H_2O$—percent P, theoretical=4.55; found 4.50. Percent H, theoretical=16.48; found 16.20.

*Pharmacological tests*

Pharmacological tests made with the product have demonstrated its low toxicity, and its unusually good tolerability. In fact, the $LD_{50}$ for rats was of 4.5 g./kg. when administered by intravenous injection, 12 g./kg. when administered intraperitoneally, and over 20 g./kg. when administered per os.

By slow perfusion in rabbits a value 8.5 g./kg. could be attained before manifestation of toxic effects.

As to the chronic toxicity, a treatment at doses of 1 g./kg. by the peritoneal route and of 4 g./kg. per os for a total time of 20 days, was tolerated in a very good weight of the tested animals (rats).

No noticeable alterations of the organs (liver, kidney, heart and lungs) were observed during the post mortem and hystologic examinations of these organs.

Even the pharmacological tests on the cardiac function, respiration, blood pressure and on isolated organs have attested the perfect tolerableness of the arginine glucose-1-phosphate, since no particularly noticeable modifications in the normal reactivity of the above functions was caused by the drug.

The anti-toxic properties were demonstrated by tests on rats, intoxicated with an ammonia salt; in these tests the survival percentage and the variations of ammonia contents in the blood were observed. During the above tests the arginine glucose-1-phosphate proved to possess marked anti-toxic properties. The protective action of the arginine glucose-1-phosphate in the experimental intoxication from ammonia is approximately twice that exerted by arginine hydrochloride alone.

TABLE 1

| Number of Animals | Treatment, mmoles/kg. | Ammonium bicarbonate, mmoles/kg. | Mortality, percent |
|---|---|---|---|
| 20 | | 10.8 | 100 |
| 20 | G-1-P of arginine (Arginil), 2 mmoles/kg. | 10.8 | 20 |
| 20 | G-1-P of arginine (Arginil), 4 mmoles/kg. | 10.8 | |
| 20 | l-arginine 4 mmoles/kg | 10.8 | 20 |

The above table shows that whereas 4 mmoles/kg. of arginine hydrochloride are required to reduce the mortality ratio down to 20%, 2 mmoles/kg. only of arginine glucose-1-phosphate are sufficient to attain the same mortality ratio. When however 4 mmoles/kg. of arginine glucose-1-phosphate are administered, then the mortality ratio is required down to zero.

nephron be not irreversibly injured. This represents an unforseen and amazing result useful in the treatment of hyperazotemia and hepatic disfunctions associated with hyperazotemia.

The field of applications of the novel drug, the average dose, and useful suggestions for the administration are given in Table 3 above.

TABLE 3

| Indication | Average posology | Remarks |
| --- | --- | --- |
| Condition of hepatic insufficiency | 1-2 phails per day; intravenous or intramuscular injection. | Cycles of 15-20 days. As auxiliary holding therapy and for children, the phial contents may be administered even per os, together with a beverage. |
| Neurotoxic manifestations, from exogenous or endogenous iperammoniaemiae. | 2-5 phials per day; intravenous or intramuscular injection. | |
| Hepatic pre-coma | 2-5 phials per day; intravenous injection or per drop phlebolysis. | |
| Hepatic pre-coma | 6-10 phials per day; intravenous injection or phlebolisis. | |
| Hepatic cirrhosis with ascitis | 1-2 phials per day; intravenous injection | |
| Renal hyperazotemiae from nephropathies, from glomerular pephritis or nophrosis (on condition that the nephron be not irremediably injured. | 1-2 phials per day for 20-30 days; intravenous or intramuscular injection. | Cycles of 15-20 days. As auxiliary holding therapy and for children, the phial contents may be administered even per os, together with a beverage. |
| Pre-renal and functional (postoperative, from intoxications, etc.) hyperazotomiae. | 1-2 phials per day (intravenous injection) until disappearance of hyperazotomiae. | Cycles of 20-30 days. As auxiliary holding therapy and for children, the phial contents may be administered even per os, together with a beverage. |
| As regenerator of hepatic tissue | 1-2 phials per day; intramuscular injection. | |

Test animals intoxicated by ammonium bicarbonate were treated as shown in the following table

TABLE 2

| Number of Animals | Treatment, mmoles per kg. | Ammonium bicarbonate, mmole/kg. | Ammonical nitrogen, mmole/kg. |
| --- | --- | --- | --- |
| 20 | | | .5 |
| 20 | Physiological solution | 10.8 | 5.2 |
| 20 | G-1-P of arginine (Arginil), 2 mmoles/kg. | 10.8 | 2.12 |
| 20 | G-1-P of arginine (Arginil), 4 mmoles/kg. | 10.8 | 1 |
| 20 | l-arginine hydrochloride, 4 mmoles/kg. | 10.8 | 2 |

Table 2 shows that my administering 4 mmoles/kg. of arginine hydrochloride to animals previously intoxicated with ammonium bicarbonate, an ammoniacal nitrogen rate of 2 is attained, whereas with like doses of arginine glucose-1-phosphate, the ammoniacal nitrogen rate is reduced to 1.

This corroborates to the above statement that a twofold protective action is exerted by the arginine glucose-1-phosphate as compared with arginine hydrochloride in the experimental intoxication from ammonia.

*Clinical experience*

Arginine glucose-1-phosphate finds useful applications in the therapy of hepatic coma, in the therapy of neurotoxic manifestations associated with hepatic insufficiencies, in the therapy of hyperammoniaemiae, and in the therapy of ascitogen hepatic cyrrhosis. The drug finds useful applications in cases of hyperazotemiae provided that the The product is administered as aqueous solution (redistilled $H_2O$) in phials, or in the form of a syrup. Usually, each phial contains 5 cm.$^3$ of solution containing 1 g. of active principle in redistilled water. The syrup contains 5 g. of active principle in 100 cm.$^3$.

What is claimed as new and desired to be secured by Letters Patent is:

1. The compound di-arginine-glucose-1-phosphate having therapeutical properties and being prepared by reacting 1 mol of glucose-1-phosphoric acid with 2 mols of arginine.

2. A method of treating a patient, suffering from hepatic disfunctions associated with hyperazotemia, comprising the step of administering to such patient an effective amount of di-arginine-glucose-1-phosphate obtained by reacting 1 mol of glucose-1-phosphoric acid with 2 mols of arginine.

3. A method of treating a patient suffering from hyperazotemia, comprising the step of administering to such patient an effective amount of di-arginine-glucose-1-phosphate obtained by reacting 1 mol of glucose-1-phosphoric acid with 2 mols of arginine.

References Cited

UNITED STATES PATENTS 3,020,201   2/1962   Osterberg _____ 167—65

SAM ROSEN, *Primary Examiner.*

JULIAN S. LEVITT, LEWIS GOTTS, *Examiners.*

J. R. GENTRY, *Assistant Examiner.*